UNITED STATES PATENT OFFICE.

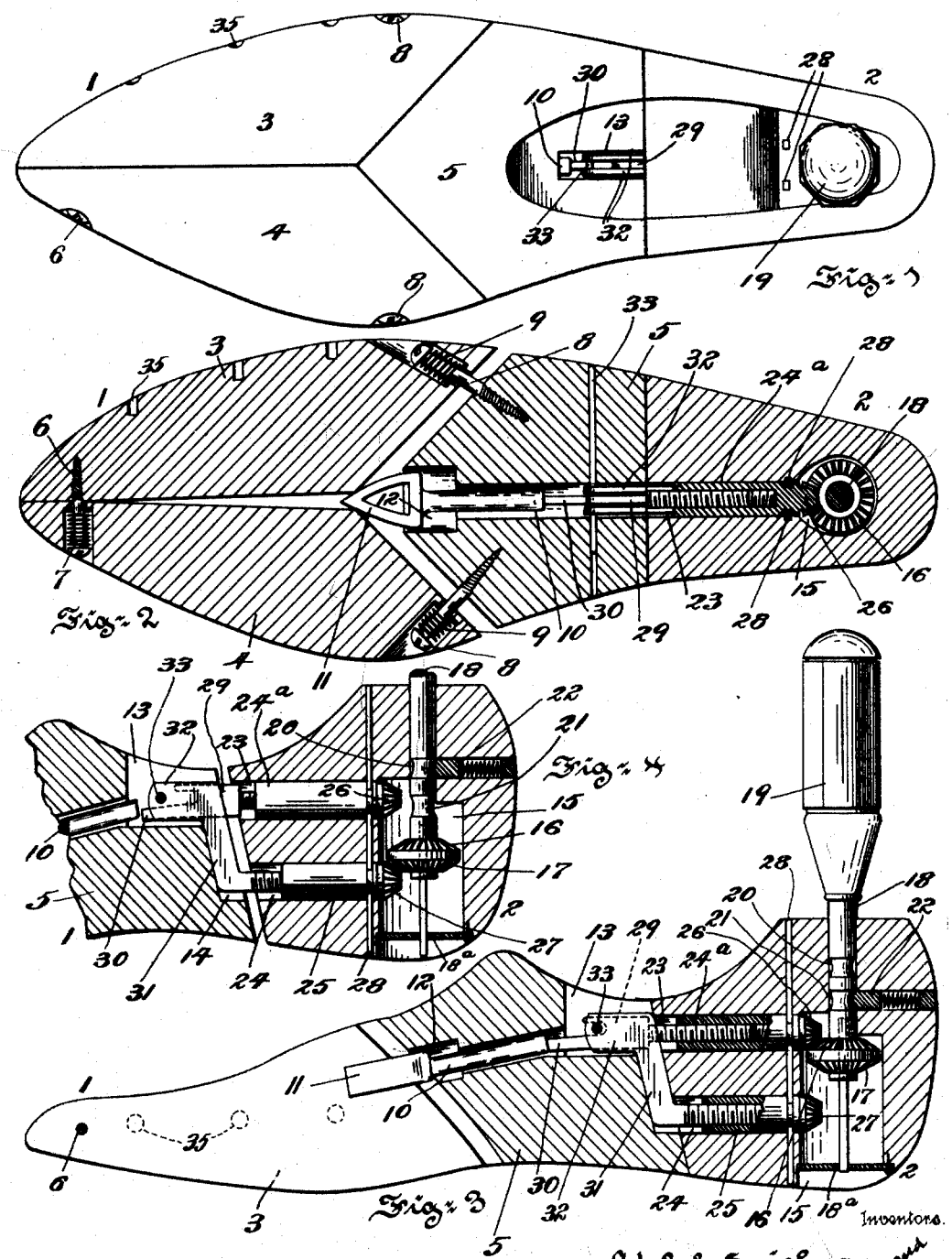
A. SPIELMAN & A. P. POST.
COMBINED SHOE TREE AND STRETCHER.
APPLICATION FILED AUG. 23, 1907.
927,083. Patented July 6, 1909.

ADOLPH SPIELMAN AND ALFRED P. POST, OF PHILADELPHIA, PENNSYLVANIA.

COMBINED SHOE TREE AND STRETCHER.

No. 927,083.        Specification of Letters Patent.        Patented July 6, 1909.

Application filed August 23, 1907. Serial No. 389,765.

*To all whom it may concern:*

Be it known that we, ADOLPH SPIELMAN and ALFRED P. POST, both citizens of the United States, residing at Philadelphia, in the county of Philadelphia and State of Pennsylvania, have jointly invented a certain new and useful Combined Shoe Tree and Stretcher, of which the following is a specification.

The principal objects of the present invention are to provide a combined shoe tree and stretcher that is simple in construction, strong, durable and efficient in use, and comparatively inexpensive to manufacture; to provide independently operative means hereinafter set forth, adapted to stretch the vamp of a boot or shoe both as to length and width; to provide an adjustable shoe tree and stretcher adapted to fit the shoe like the original last and when stretching to gradually apply the pressure, so as to prevent straining the stitching or leather, and further to so arrange the apparatus that no stretching will take place at the toe portion of the shoe; and to provide an adjustable shoe tree and stretcher which may be used independently as a shoe tree, independently as a stretcher, or as a combined shoe tree and stretcher, by virtue of mechanism independently operated by an adjustable medium hereinafter referred to.

With the foregoing and other objects in view the invention consists of the improvements hereinafter described and finally claimed.

The nature, characteristic features and scope of the invention will be more fully understood by reference to the accompanying drawings, forming part hereof, and in which—

Figure 1, is a plan view of a combined shoe tree and stretcher embodying the invention. Fig. 2, is a similar view in section illustrating how the device may be used as a stretcher, independently of any movement as to its length. Fig. 3, is a longitudinal sectional view of the same, and Fig. 4, is a fragmentary view in section illustrating the manner of lengthening the tree independently of the stretching mechanism.

In the drawings the combined shoe tree and stretcher is shown as comprising two hinged sections 1 and 2, of which the former constitutes the forward section and the latter the rear section. The forward section 1, is made up of three beveled members 3, 4, and 5, which are, when in normal position, adapted to have the beveled parts abut against each other to constitute what may be termed the last. Of these three members those designated 3 and 4, are movable angularly in respect to each other and in respect to the member 5, by virtue of mechanism hereinafter referred to. The forward ends of the members 3 and 4, are connected together by means of a screw 6. As shown, the screw 6, rigidly engages the member 3, and loosely fits within the counter-sunk portion of the member 4. Between the innermost wall of the counter-sunk portion and the head of the screw 6, is a spring 7, that serves to assist the screw 6 in keeping the member ends in place. Each of the members 3 and 4, are similarly secured to the member 5, as clearly illustrated in Figs. 1 and 2, the screws 8 and springs 9, serving such purpose. The member 5, which is shown as being in one piece is centrally perforated for the passage therethrough of a longitudinal shiftable spreader, comprising a shank 10, having its forward end provided with a generally spear-like head 11, the purpose of which is to spread the members 3 and 4, when operated upon by means to be described. The head 11, normally rests within the reamed out portion 12 of the member 5. The member 5, is further cut away as at 13 and 14 for a purpose to be presently described.

The rear or heel section 2, of the shoe tree is provided with a vertically extending chamber 15, within which is positioned a vertically slidable miter gear having a double set of teeth 16 and 17, the said gear being carried by a rotatable shaft 18, provided with a handle 19. This shaft 18, is peripherally grooved as at 20 and 21, so as to register with a spring controlled detent 22, as the shaft is moved upward or downward, the lower end being guided as at 18$^a$. Extending from the forepart of the heel section 2, rearwardly to and communicating with the chamber 15 are longitudinally arranged chambers 23 and 24, accommodating internally threaded sleeves 24$^a$ and 25, having contracted shanks terminating in miter-gears 26 and 27, the said gears being positioned within the chamber 15 and adapted to mesh, independent of each other, with the double miter gear carried by the shaft 18 in its vertical movement through the chamber 15. The sleeves 24$^a$ and 25, are locked against endwise movement by reason of pins 28 that pass through the heel section 2 and engage the grooves formed by the shanks of the sleeves, but obviously do not interfere with the rotation of said sleeves.

Having screw threaded relation with the sleeve 24ᵃ, is a threaded shank carrying a comparatively thin and slotted plate 29, terminating in a pusher arm 30. Having similar relation with the sleeve 25, is a threaded shank terminating in an arm 31, having a bifurcated head 32, that straddles the plate 29, see Figs. 1 and 2. The rear section 2, is hinged to the forward section 1, by pivotally connecting the bifurcated head 32, to the member 5, as at 33. In this connection the cut away portion of the member 5, accommodates the arm 31 and the similar portion 13 accommodates the plate 29 and head 32 and further permits of the free movement of the hinged parts. The slotted portion of the plate 29, permits movement of the pusher arm 30 with respect to the pivoted member.

A description will now be given of the operation of the above described parts. For the sake of illustration, assuming that the shoe tree as shown in Fig. 1, is of the proper size for fitting a shoe and after inserting same therein, it is desired to stretch the width of the shoe, the handle 19, is pulled up so that the detent 22 engages the recess 21, of the shank 18, which causes the teeth 16, of the double miter gear to engage the miter gear 26, of the sleeve 24, see Fig. 3, and upon rotating the handle the plate 29 and its pusher finger 30 are caused to move forward, thus shifting the shank 10, and its spear like head 11 in the same direction against the beveled parts of the sections 3 and 4, see Fig. 2, thus causing them to spread at their rearward portions in contradistinction to their forward or toe parts. Upon a reverse rotation of the handle the parts are returned to place, the springs 7 and 9, assisting in this respect. Assuming now that the width stretching feature is not desired and it is merely a matter of lengthening the tree, the handle 19, is forced downward, thus causing the detent 22, to engage the upper recess upon the shank and permitting the teeth of the double miter to mesh with the gear 27, whereupon, rotation of the handle 19, will cause a forward movement of the entire forward section 1, see Fig. 4. Obviously if it be desired to expand the tree both as to length and width, the same may be accomplished as will be readily understood without further description. Openings 35, upon the forward members, accommodate metallic parts used in the stretching process if desired.

What we claim is:

1. A device of the class described consisting of a forward and rear section hinged together, said forward section comprising an instep member having movable toe parts, resilient means for connecting the toe parts together at their outer ends, resilient means for connecting the said toe parts at their inner ends to said instep member, a longitudinally shiftable spreader penetrating the instep member and adapted to engage the rear walls of said movable toe parts, longitudinally shiftable means carried by the rear section for engaging the spreader and rotatable operating mechanism for actuating the said shiftable means.

2. A device of the class described consisting of a forward and rear section hinged together, the said forward section comprising a pair of toe parts and an instep part, a spreader adapted to operate upon the rear walls of the toe section, an internally threaded sleeve capable of rotation but locked against endwise movement carried by the rear section, longitudinally-shiftable actuating means engaging the rotatable sleeve and adapted to contact with and move forward the spreader, and rotatable operating mechanism for engaging the rotatable sleeve.

3. A device of the class described comprising a forward and rear section, said front section being capable of extension both as to length and breadth, a spreader for the front section, independent mechanism for coöperating with the spreader carried by the rear section, an internally threaded sleeve capable of rotation but locked against endwise movement also carried by the rear section, longitudinally shiftable actuating means for extending the device as a whole engaging the rotatable sleeve, said means being hinged to the forward section and shiftable operating mechanism for coöperating separately with the aforesaid device for widening or extending the tree.

4. A device of the class described comprising a forward and rear section, a spreader for the first mentioned section, longitudinally shiftable spreader actuating means carrying a pusher arm positioned in the last mentioned section, longitudinally shiftable extension actuating mechanism having a bifurcated head also positioned in the last mentioned section, independently rotatable mediums operatively connected with one of each of said longitudinally shiftable devices, means for hinging the first mentioned section to the bifurcated head, rotatable operating means capable of being raised and lowered through the rear section for coöperating separately with the rotatable mediums, and a spring controlled detent adapted to register with said operating means to limit its range of vertical movement.

5. A device of the class described comprising a front and rear section said front section being capable of extension both as to length and breadth, means for hinging the sections together, a spreader for the front section, independent mechanism capable of rotation and longitudinal movement for coöperating with the spreader, carried by the rear section, other mechanism also capable of rotation and longitudinal movement for extending the device as a whole, and rotatable operating mechanism capable of vertical movement through the rear section for independently widening or extending the tree.

6. A device of the class described consisting of a forward and rear section hinged together, the said forward section comprising an instep portion having movably secured thereto a two-part toe portion the outer ends of which are held against lateral movement, a spreader carried by the instep portion and adapted to operate upon the rear walls of the toe portion and laterally move the same, independent mechanism capable of rotation and longitudinal movement for coöperating with the spreader carried by the rear section and rotatable operating mechanism capable of vertical movement through the said rear section adapted to coöperate with said spreader mechanism.

7. A shoe tree comprising a front and rear section hinged together, said front section comprising an instep and a two-part toe portion, resilient means for connecting the outer ends of the toe portion together, resilient means for connecting the toe portion to the instep portion said means serving to permit of the two parts advancing toward or receding from the instep portion and means for stretching the toe parts laterally at their inner ends.

8. The combination in a shoe tree of a hinged forward and rear section, a spreader for the first mentioned section, said section being normally free and independent of its operating mechanism, longitudinally shiftable spreader actuating means positioned in the last mentioned section, longitudinally shiftable extension actuating mechanism also positioned in said last mentioned section, independently rotatable mediums operatively connected with one of each of said shiftable devices and rotatable operating mechanism capable of being raised and lowered through said rear section for coöperating separately with the rotatable mediums.

In testimony whereof we have hereunto signed our names.

ADOLPH SPIELMAN.
ALFRED P. POST.

Witnesses:
W. J. JACKSON,
GRANT O. OSBORNE.